(12) United States Patent
Jung et al.

(10) Patent No.: US 8,923,935 B2
(45) Date of Patent: Dec. 30, 2014

(54) MOBILE TERMINAL AND KEYPAD MANUFACTURING METHOD THEREOF

(75) Inventors: Jaejun Jung, Seoul (KR); Donghyuk Cho, Seoul (KR); Siyoung Park, Incheon (KR); Seongjoon Park, Seoul (KR); Jaichul Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 337 days.

(21) Appl. No.: 13/552,261

(22) Filed: Jul. 18, 2012

(65) Prior Publication Data

US 2013/0023310 A1 Jan. 24, 2013

(30) Foreign Application Priority Data

Jul. 19, 2011 (KR) .......................... 10-2011-0071679

(51) Int. Cl.
*H04M 1/00* (2006.01)
*G06F 1/16* (2006.01)

(52) U.S. Cl.
CPC ............ *G06F 1/1624* (2013.01); *G06F 1/1662* (2013.01)
USPC ....................... 455/575.4; 455/566; 455/550.1

(58) Field of Classification Search
USPC .................. 455/575.1–575.9, 90.1–90.3, 566, 455/550.1
See application file for complete search history.

(56) References Cited

U.S. PATENT DOCUMENTS

| | | | |
|---|---|---|---|
| 6,041,120 A * | 3/2000 | Olkkola | 379/433.01 |
| 6,263,070 B1 * | 7/2001 | Kubo et al. | 379/368 |
| 6,507,336 B1 * | 1/2003 | Lunsford | 345/168 |
| 6,633,241 B2 * | 10/2003 | Kaikuranta et al. | 341/33 |
| 6,965,782 B1 * | 11/2005 | Nuovo et al. | 455/550.1 |
| 7,432,911 B2 * | 10/2008 | Skarine | 345/168 |
| 8,396,520 B2 * | 3/2013 | Jung | 455/575.4 |
| 8,463,338 B2 * | 6/2013 | Jung | 455/575.4 |
| 8,682,405 B2 * | 3/2014 | Park et al. | 455/575.4 |
| 2004/0005183 A1 * | 1/2004 | MacFarlane | 400/472 |
| 2007/0298828 A1 * | 12/2007 | Begic et al. | 455/550.1 |
| 2009/0036176 A1 * | 2/2009 | Ure | 455/575.3 |
| 2012/0299832 A1 * | 11/2012 | Peterson et al. | 345/168 |

* cited by examiner

*Primary Examiner* — Sharad Rampuria
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit configured to display information; a circuit board having one surface with a plurality of switches thereon; and a keypad disposed over the circuit board and having keys that when pressed, contact corresponding switches on the circuit board. Further, the keypad further includes a plurality of actuators corresponding to and protruding towards the plurality of switches; key-shaped parts laminated on the actuators, respectively, and each having a predetermined height; and a film part disposed to obscure the key-shaped parts and having one surface with key marks in correspondence with the key-shaped parts so as to form the keys of the keypad. In addition, the key-shaped parts and the film part are integrally formed together.

18 Claims, 6 Drawing Sheets

MOBILE TERMINAL AND KEYPAD MANUFACTURING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0071679, filed on Jul. 19, 2011, the contents of which is incorporated by reference herein in its entirety.

BACKGROUND OF THE INVENTION

1. Field of the Invention

This specification relates to a mobile terminal having a keypad.

2. Background of the Invention

Mobile device (mobile terminal, portable device, portable terminal) can be easily carried and have one or more of functions such as supporting voice and video telephony calls, inputting and/or outputting information, storing data and the like. As it becomes multifunctional, the mobile terminal can capture still images or moving images, play music or video files, play games, receive broadcast and the like, so as to be implemented as an integrated multimedia player.

To perform those various functions and input information, the mobile terminal has an input device. The input device is implemented in various types, such as a dome switch, a touchpad, a touch screen, a jog wheel and the like.

An input device using the dome switch is operating responsive to pressing to input information. However, the structured arrangement of the related art dome switch increases the thickness of the terminal.

SUMMARY OF THE INVENTION

Therefore, an aspect of the detailed description is to provide a keypad in a more simplified structure by integrally forming a key-shaped part and a film part.

Another aspect of the detailed description is to provide a slimmer slide type mobile terminal by reducing a thickness of a keypad.

To achieve these and other advantages and in accordance with the purpose of this specification, as embodied and broadly described herein, there is provided a mobile terminal including a circuit board having one surface with a plurality of switches thereon, and a keypad configured such that the switch is pressed to allow for a key input, wherein the keypad may include a plurality of actuators corresponding to the plurality of switches, key-shaped parts laminated on the actuators, respectively, and each having a predetermined height, and a film part disposed to obscure the key-shaped parts and having one surface with key marks in correspondence with the key-shaped parts, wherein the key-shaped parts and the film part may be integrally formed.

In one aspect of the detailed description, the actuators may be integrally connected to one another by extending portions.

In another aspect of the detailed description, groove portions recessed into a predetermined depth may be formed between the key-shaped parts and disposed on the extending portions, and a frame part may be disposed on the groove portions to partially cover side surfaces of the key-shaped parts.

In another aspect of the detailed description, a light guide film may be laminated between the actuators and the circuit board, and the key-shaped part and the actuator may be pressed onto each other to enhance transmittance of light.

In another aspect of the detailed description, each of the key-shaped parts may include upper and lower surfaces and a plurality of side surfaces, and the film part may partially cover the upper surface and the plurality of side surfaces of the key-shaped part.

In accordance with one exemplary embodiment, there is provided a mobile terminal including a first body and a second body, a slide module allowing the first and second bodies to be movable relative to each other, and a keypad disposed on one surface of the second body to allow for a key input, wherein the keypad may include a plurality of actuators, key-shaped parts laminated on the actuators, respectively, and each having a predetermined height, and a film part disposed to cover the key-shaped parts and having one surface with key marks corresponding to the key-shaped parts, wherein the film part, the key-shaped parts and the actuators may be integrally coupled to make no gap between the film part and the key-shaped part and between the key-shaped part and the actuator.

In accordance with one exemplary embodiment, there is provided a method for fabricating a keypad in a mobile terminal, the method including forming a key mark on one surface of a film part, coating an adhesive member on one surface of the film part and disposing a key-shaped part with a predetermined thickness, and putting the key-shaped part and the film part into a mold and disposing a base member to cover the key-shaped part and the film part, to mold the base member into a form of actuator in a pressing manner, wherein the film part, the key-shaped part and the actuator may be integrally formed by the pressing.

In one aspect of the detailed description, the molding of the base member into the actuator may include pressing the base member to form a groove portion recessed by a predetermined depth between the key-shaped parts.

In one aspect of the detailed description, the method may further include coupling a frame part onto the groove portion to cover side surfaces of the key-shaped part.

In a mobile terminal in accordance with at least one exemplary embodiment, a key assembly includes a film part, key-shaped parts and actuators which are integrally formed, which allows for implementation of a slimmer keypad.

Also, no gap is present between the film part and the key-shaped part and between the key-shaped part and the actuator, resulting reduction of a loss of light, which is transmitted from a light guide film to the exterior via the key-shaped part. Therefore, a current required for key lighting can be reduced, which results in reduction of power consumption of a battery.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the Detailed Description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a mobile terminal according to the exemplary embodiments, with reference to the accompanying drawings. For the sake of brief description with reference to the drawings, the same or equivalent components will be provided with the same reference numbers, and description thereof will not be repeated. The expression in the singular form in this specification will cover the expression in the plural form unless otherwise indicated obviously from the context.

Figure 1:
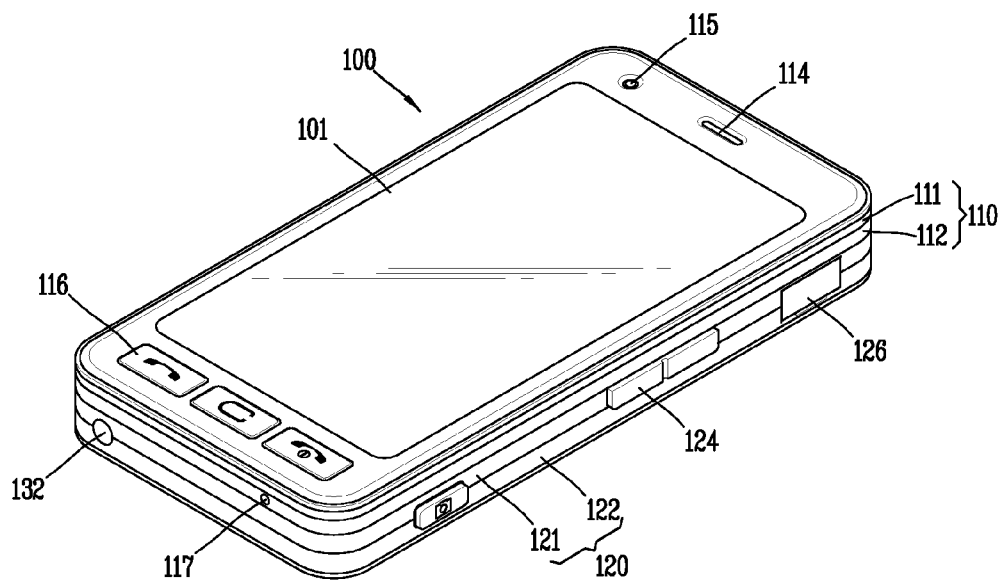
FIG. 1 is a perspective view showing a closed state of a mobile terminal in accordance with one exemplary embodiment.
Figure 2:
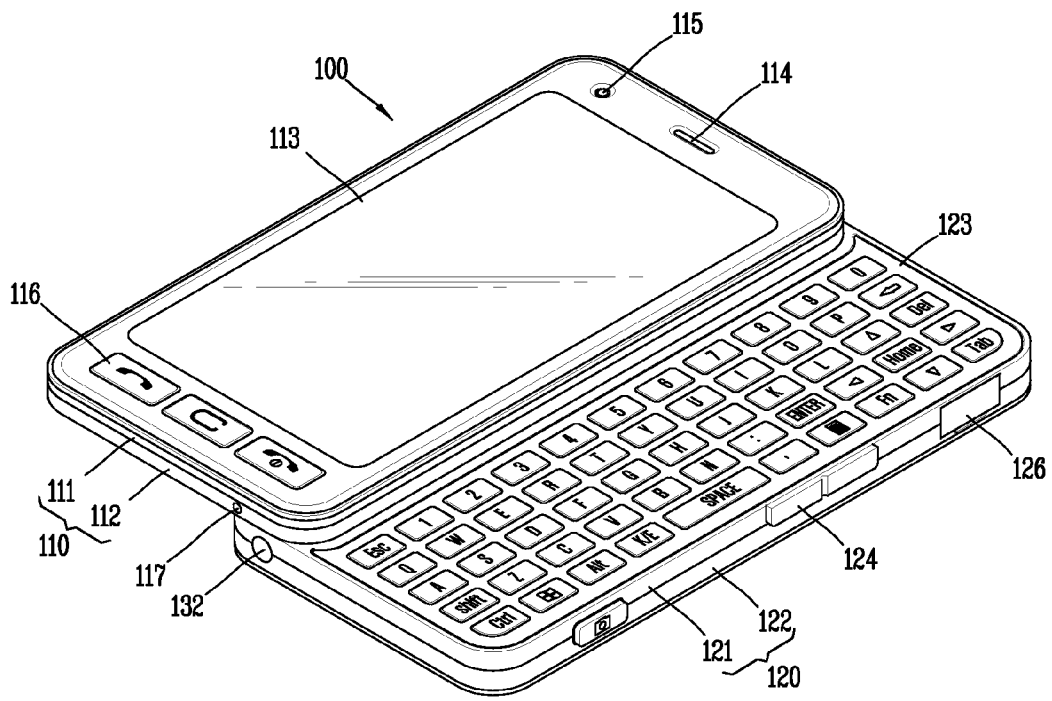
FIG. 2 is a perspective view showing an open state of the mobile terminal shown in FIG. 1.

FIGS. 1 and 2 are front perspective view of a mobile terminal 100 according to this specification. FIG. 1 shows a closed state of the mobile terminal and FIG. 2 shows an open state of the mobile terminal.

As shown in FIGS. 1 and 2, the mobile terminal 100 may include a first body 110 and a second body 120 coupled to each other to be relatively movable. FIGS. 1 and 2 especially show the mobile terminal 100 which can be open by a widthwise (horizontal) sliding motion. Here, the present disclosure may also be applied to an example implementing an open state by a lengthwise (vertical) sliding motion.

A case (casing, housing, cover, etc.) forming an outer appearance of the first body 110 may be formed from a front case 111 and a rear case 112. A space formed by the front case 111 and the rear case 112 may accommodate various components therein.

The first body 110, in detail, the front case 111 is shown having a display unit 113, an audio output module 114, a first image input module 115, a first manipulation unit 116, an audio input unit 117 and the like.

The first body 110 is positioned over the second body 120, which is referred to as a closed position (closed state or closed configuration). As shown in FIG. 1, the first body 110 exposes at least part of the second body 120, which is referred to as an open position (open state or open configuration). This exemplary embodiment illustrates the sliding as 'movement' of the first body 110 and the second body 120 with respect to a base, but the present disclosure is not limited to that. For example, one of the first and second bodies 110 and 120 may be swung or swiveled with respect to the other.

The mobile terminal may typically operate in a standby mode in the closed configuration but such standby mode may be released according to a user's manipulation. Also, the mobile terminal may typically operate in a call-communication mode in the open configuration but such mode may be converted into the standby mode according to the user's manipulation or after a certain time duration.

Functions or components disposed on upper surfaces of the first body 110 and the second body 120 may depend on which function is emphasized in the mobile terminal 100 or which user interface is pursued. As one example, referring to FIG. 2, the display unit 113 may be disposed on an upper surface of the upper body 110 and a second manipulation unit 123 for inputting a control command may be disposed on an upper surface of the lower body 120.

The audio output module 114 may include a receiver, a speaker, and so on. The first image input module 115 may be implemented in form of a camera module for capturing an image or video for a user.

The first manipulation unit 116 may receive a command input for controlling an operation of the mobile terminal. The audio input unit 117 may be implemented as a microphone. The audio input unit 117 may be disposed to be symmetrical to the audio output module 114 based on the display unit 113.

Similar to the first body 110, a case of the second body 120 may be formed from a front case 121 and a rear case 122. The second manipulation unit 123 (see FIG. 2) may be disposed at the second body 120, particularly, at a front face of the front case 121. A broadcast receiving antenna 132 may be disposed at one side of the second body 120. The antenna 132 may be drawn out of the second body 120.

Referring to FIG. 2, when the first body 110 is slid with respect to the second body 120, the second manipulation unit 123 located at the front case of the second body 120, which is overlapped by the first body 110 in the closed configuration (i.e., the state of FIG. 1), is exposed from the first body 110.

Keys of the exposed second manipulation unit 123 can receive inputs associated with information output on the display unit 113. The second manipulation unit 123 may include letter (character) keys (for example, Korean consonants/vowels and English alphabets, etc.), number keys and the like. The letter keys are in a QWERTY arrangement. With the letter keys disposed in the QWERTY arrangement, a user can easily compose text messages, memos, e-mails and the like in English.

When the second manipulation unit 123 is a touch screen, icons of function keys may be output on an exposed portion of the touch screen to be sensitive to touch. For example, when a video is output on the display unit 113, the function keys may receive a command input for implementing a function, such as pause, play, rewind, forward, displaying of a reproduction list or the like.

The illustration has been given in the aspect that the second manipulation unit 123 is disposed at the front face of the second body 120, but the present invention is not limited to the configuration. For example, a second display unit interlocking with the display unit 113 may be disposed at the front face of the second body 120.

Also, a third manipulation unit 124, an interface unit 126 and the like may be disposed at a side surface of the second body 120. The first to third manipulation units 116, 123 and 124 may be referred to as a manipulating portion. Such manipulating portion can employ any tactile manner that a user can touch or tap for manipulation.

For instance, the manipulation portion may be implemented as a dome switch, a touch screen, a touchpad or the like by which a user can input commands or information in a pushing or touching manner. Alternatively, the manipulating portion may be implemented as a wheel or a jog which rotates keys or a joystick.

From the functional perspective of the first to third manipulation units 116, 123 and 124, the first manipulation unit 116 is configured to input commands such as START, END, SCROLL or the like, and the second manipulation unit 123 is configured to input numbers, letters (characters), symbols or the like. Also, the third manipulation unit 124 can be worked as a hot key which performs a specific function, such as activating the first image input module 115, and the like.

The interface 126 may serve as a path for allowing data exchange between the mobile terminal and an external device. For example, the interface unit 126 may be at least one of wired/wireless earphone ports, ports for short-range communication (e.g., IrDA, Bluetooth, WLAN, etc.), power supply terminals for power supply to the mobile terminal and the like. The interface unit 126 may be a card socket for coupling to external cards, such as a Subscriber Identity Module (SIM), a User Identity Module (UIM), a memory card for storage of information and the like.

Figure 3:
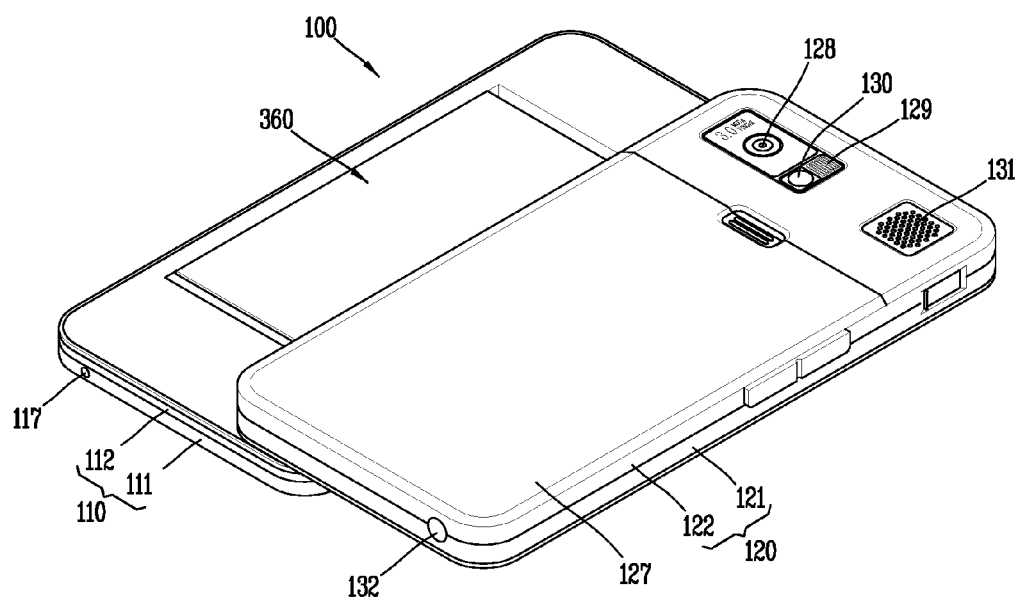
FIG. 3 is a perspective view showing a rear surface of the mobile terminal of FIG. 2.

Next, FIG. 3 is a rear perspective view of the mobile terminal 100 of FIG. 2.

As shown in FIG. 3, a power supply unit 127 may be provided at the second body 120 to supply power to at least one component of the mobile terminal 100. The power supply unit 127, for example, may include a rechargeable battery for power supply.

The rear case 122 of the second body 120 may further be provided with a second image input module 128. The second image input module 128 faces a direction which is opposite to a direction faced by the first image input module 115 (see FIG. 1), and may have different pixels from those of the first image input module 115.

For example, the first image input module 115 may operate with relatively lower pixels (lower resolution). Thus, the first image input module 115 may be useful when a user can capture his face and send it to another party during a video call or the like. On the other hand, the second image input module 128 may operate with a relatively higher pixels (higher resolution) such that it can be useful for a user to obtain higher quality pictures for later use.

A flash 129 and a mirror 130 may additionally be disposed adjacent to the second image input module 128. The flash 129 operates in conjunction with the second image input module 128 when taking a picture using the second image input module 128. The mirror 130 can cooperate with the second image input module 128 to allow a user to photograph himself in a self-portrait mode.

A second audio output module 131 may further be disposed at a rear case 122. The second audio output module 131 can cooperate with the first audio output module 114 (see FIG. 2) to provide stereo output. Also, the audio output module 131 may be configured to operate as a speakerphone.

As described above, the second image input module 128 or the like is disposed at the second body 120; however, the present invention is not limited to this configuration. It is also possible that one or more of those components, which have been described to be implemented on the rear case 122, such as the second image input module 128, will be implemented on the first body 110, particularly, on the rear case 112.

In this configuration, the component(s) disposed on the rear case 112 can be protected by the second body 120 in a closed state of the portable terminal. In addition, without the second image input module 128, the first image input module 115 can be implemented to be rotatable so as to rotate up to a direction which the second image input module 128 faces.

When the first body 110 is further slid, a wider area of the front face of the second body 120 is exposed. With the exposed area increased, hardware functions of the terminal may be more improved. For example, the letter keys and the number keys of the second manipulation unit 123 (see FIG. 2) may be greater in size.

Figure 4:
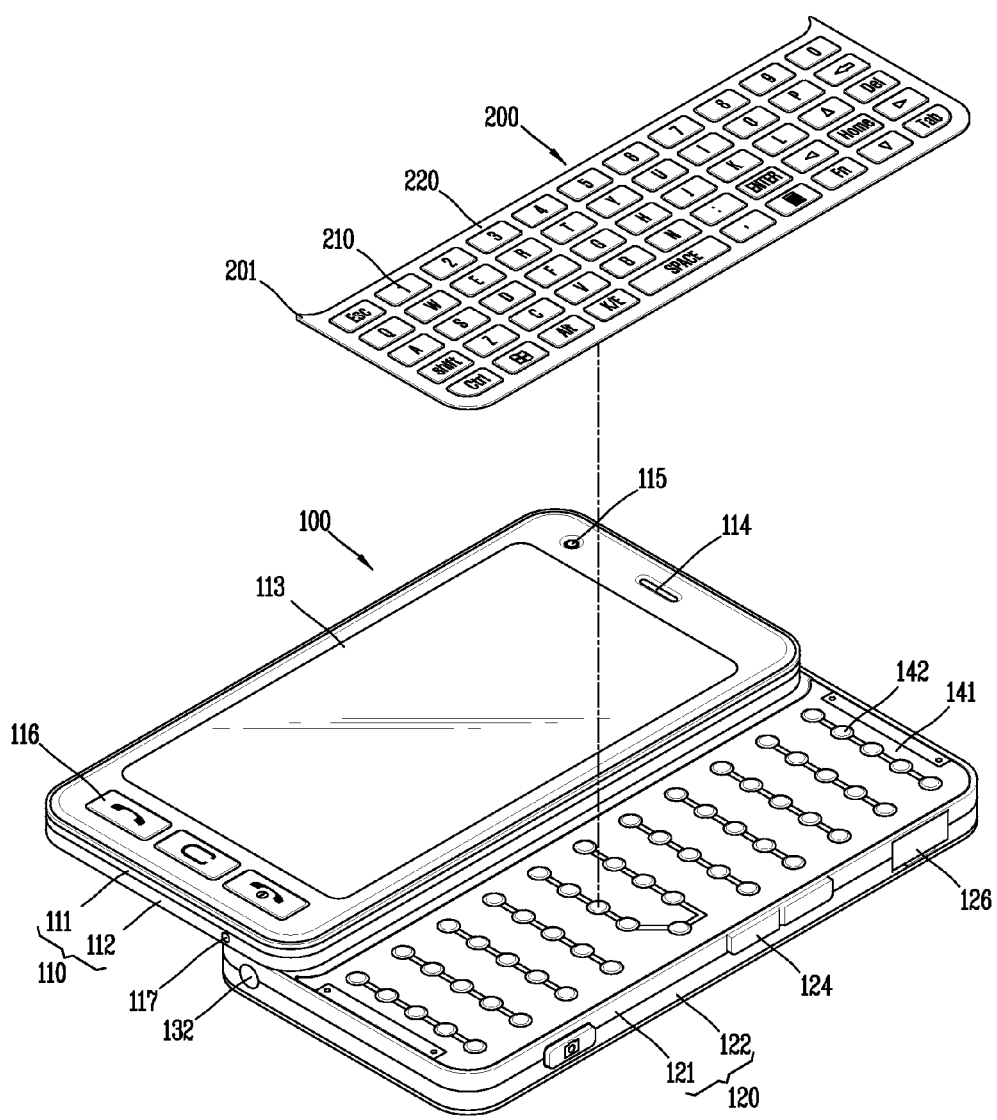
FIG. 4 is a perspective view in a keypad-separated state of FIG. 2.
Figure 5:
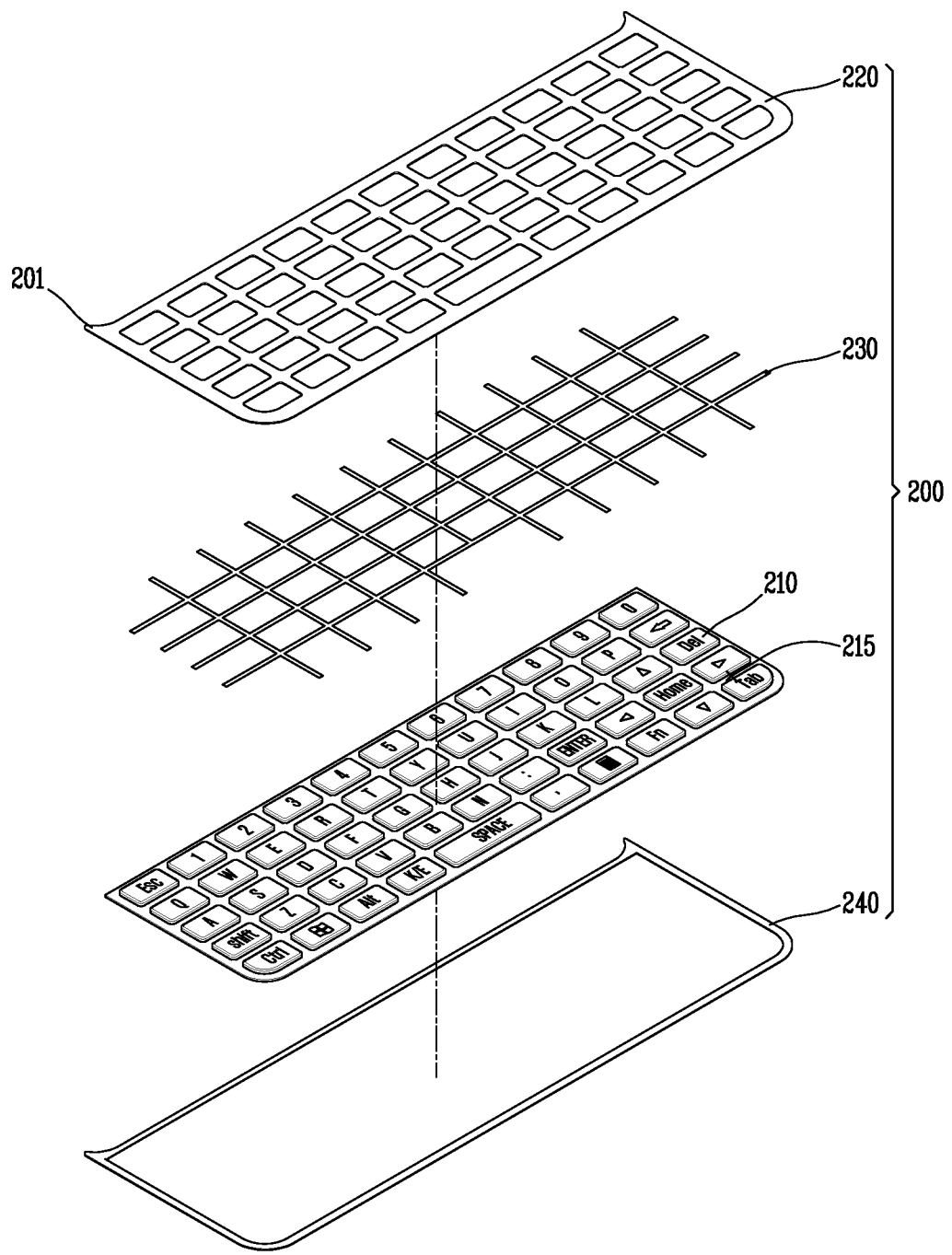
FIG. 5 is a disassembled perspective view of a keypad in accordance with one exemplary embodiment.

Next, FIG. 4 is a perspective view with a keypad 200 separated from FIG. 2, which shows the separated keypad and a circuit board 141 having a plurality of switches 142 in an exposed state of the portion of the second body 120 occupied by the keypad 200. FIG. 5 is a disassembled perspective view of the keypad 200.

The keypad 200 may include a key assembly 210, a frame part 220, and a coupling member 230 for coupling the key assembly 210 and the frame part 220 to each other.

As shown in FIGS. 4 and 5, the key assembly 210 and the frame part 220 may be coupled to each other. The key assembly 210 may include groove portions 215. As one example, the coupling member 230, such as a both-sided tape, as shown in FIG. 5, may overlap the groove portions 215 to adhere the key assembly 210 with the frame part 220. The frame part 220 may extend wider than an outer circumference of the key assembly 210. A both-sided tape 240 may be adhered onto the externally extended portion of the frame part 220, such that the frame part 220 can be coupled to the second body 120. The coupling between the key assembly 210 and the frame part 220 or between the frame part 220 and the second body 120 is not limited to the method, but various methods, such as using a UV resin or adhesive resin, are applicable.

The frame part 220 may be formed of a metal such as stainless steel (STS) or synthetic resin such as polyethylene terephthalate (PET).

Protruding portions 201, as shown in FIG. 4, may be formed at both ends of one side of the frame part 220, so as to be located at a portion adjacent to one side surface of the first body 110 in a closed state of the terminal. Accordingly, a contact area between the keypad 200 and the second body 120 can be wider to increase a coupling force. Consequently, this prevents the keypad 220 from being lifted due to interruption between a lower surface of the first body 110 and an upper end of the key assembly 210 during sliding. The protruding portions 201 may also be coupled to the second body 120 more firmly by being inserted into the corresponding portions of the second body 120.

In addition, the printed circuit board (PCB) 141 may be mounted onto the second body 120. The PCB 141 may be implemented as a rigid plate, and may be electrically connected to a main board within the terminal body by a flexible PCB (FPCB).

Figure 6:
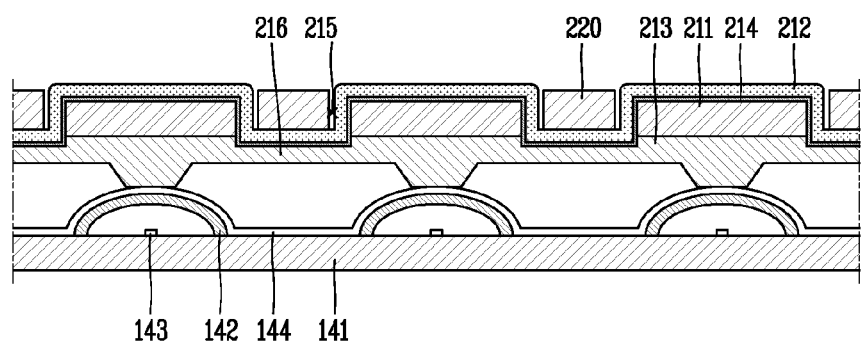
FIG. 6 is a sectional view showing a laminated state of the keypad, switches and a circuit board shown in FIG. 4.

Referring to FIG. 4 and FIG. 6, the switches 142 may be disposed on one surface of the PCB 141 facing actuators 213. The switches 142 may be disposed long in a lengthwise direction of the PCB 141. A contact 143 may be formed on one surface of the PCB 141 with being obscured by the corresponding switch 142.

When a user presses a key-shaped part having a film part attached thereon, the actuator 213 corresponding to the key-shaped part is moved in the pressed direction so as to press the corresponding switch 142. When the switch 142 is then elastically varied to come in contact with the contact 143, a current starts to flow, thereby generating one signal corresponding to a control command of the key-shaped part under control of a controller.

Figure 7:
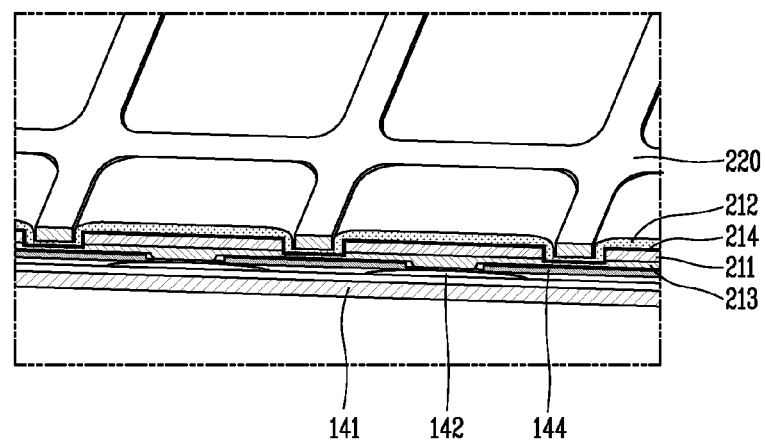
FIG. 7 is a perspective view of FIG. 6.

In more detail, FIG. 6 is a sectional view showing a laminated state of the key assembly 210, the switches 142 and the PCB 141 shown in FIG. 4, and FIG. 7 is a perspective view of FIG. 6.

As shown in FIGS. 6 and 7, the key assembly 210 may include a plurality of actuators 213 corresponding to the switches 142, key-shaped parts 211 disposed on the respective actuators 213, and a film part 212 covering the key-shaped parts 211.

The key-shaped part 211 may be implemented as a polyhedron having a predetermined height for user's convenience upon manipulation. The polyhedron may be a hexahedron having upper and lower surfaces and four side surfaces. The upper surface may be patterned to be concave or convex entirely or partially. Hence, the user can be facilitated to input a key and recognize each key by the tactile feel by virtue of the concave or convex pattern of the upper surface. The key-shaped part 211 may contain polycarbonate (PC).

The film part 212 may cover the upper surfaces of the key-shaped parts 211 each having a key mark formed on one surface thereof. According to the present disclosure, the film part 212 may be configured to cover the side surfaces of the key-shaped parts 211 at least partially or entirely, as well as the upper surfaces of the key-shaped parts 211.

For production of the keypad 200, the key-shaped parts 211 are laminated on the film part 212 to be put into a mold. The key-shaped parts 211 and the film part 212 are then pressed to fabricate the key assembly 210. Accordingly, the film part 212 covers the upper surface and the side surfaces of each key-shaped part 211. Hence, the keypad 200 according to the one exemplary embodiment may be formed slimmer with providing a three-dimensional effect.

Also, the actuator 213 may be laminated on the corresponding key-shaped part 211 to be pressed thereon. Hence, the film part 212, the key-shaped parts 211 and the actuators 213 which configure the key assembly 210 may be integrally formed. Also, a gap is not present between the film part 212 and the key-shaped part 211 and between the key-shaped part 211 and the actuator 213, so the key assembly 210 can be slimmer. Here, the actuator 213 may be formed of rubber having flexibility. An adhesive member 214 is also disposed between the key-shaped parts 211 and film part 212.

As shown in FIGS. 6 and 7, since each key-shaped part 211 corresponds to a key mark, they may be separately formed and independently operated. That is, the key-shaped parts 211 may be separated from one another, and have different sizes and shapes. On the other hands, the actuators 213 may be integrally connected together by extending portions 216.

Here, since the actuators 213 have to be able to operate independent of one another with respect to vertical motions of the adjacent different key-shaped parts 211 upon applying a key input, the extending portions 216 for connection of the actuators 213 may be formed thinner. That is, to prevent generation of a plurality of key inputs due to the adjacent actuators 213 being simultaneously pressed when one actuator 213 is pressed, the actuators 213 may independently operate although being connected to one another.

When the key-shaped part 211 is pressed for a key input, only the pressed key-shaped part 211 is moved down to press down the switch 142 located therebelow against elasticity of the switch 142, such that the switch 142 can come in contact with the contact 143 below the switch 142, thereby generating a signal responsive to the key input.

An upper surface of the extending portion 216 for connecting the adjacent actuators 213 corresponds to the groove portion 215. The groove portion 215 is recessed by a predetermined depth between the adjacent key-shaped parts 211. The frame part 220 may be disposed on the groove portions 215 to be coupled to the key assembly 210.

The frame part 220 may be disposed on the groove portions 215 to partially cover the side surfaces of each key-shaped part 211. The frame part 220 may be integrally formed.

Referring to FIGS. 6 and 7, a light guide film 144 may be deposited between the actuator 213 and the circuit board 141.

The key-shaped part 211 and the actuator 213 may be pressed onto each other so as to enhance transmittance of light coming from the light guide film 144.

In accordance with the one exemplary embodiment, the film part 212, the key-shaped parts 211 and the actuators 213 are integrally formed to configure the key assembly 210, and a gap is not present between the film part 212 and the key-shaped part 211 and between the key-shaped part 211 and the actuator 213, which results in reduction of a loss of light transmitted to the outside from the light guide film 144 via the key-shaped part 211. Therefore, a current required for key lighting can be reduced, thereby reducing power consumption of a battery.

Figure 8A:
FIGS. 8A-8C are overviews showing a process of producing a keypad in accordance with one exemplary embodiment.
Figure 8B:
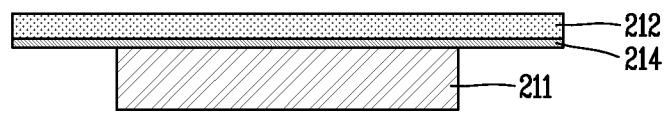
Figure 8C:
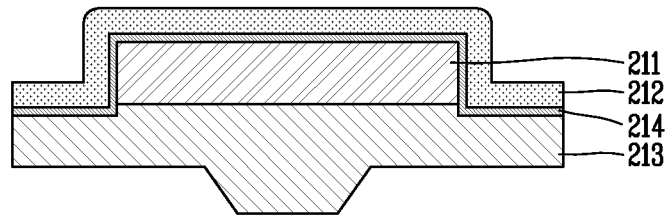

FIGS. 8A-8C are overviews showing a process of fabricating the key assembly 210 in accordance with one embodiment of the present invention. As shown in FIGS. 8A-8C, a key mark is formed on one surface of a film part 212. An adhesive member 214 is coated on one surface of the film part 212, and a key-shaped part 211 with a predetermined thickness is deposited on the adhesive member 214. The film part 212 having the key-shaped part 211 on the one surface thereof is put into a mold, and a base member is disposed to cover the key-shaped part 211 and the film part 212. Here, the base member corresponds to the actuator 213 for pressing the switch 142 after being molded. The base member may be formed of a material such as rubber having flexibility.

A pressing process for the mold is performed such that the base member can be molded into the form of the actuator 142. Through the pressing, the film part 212, the key-shaped part 211 and the actuator 213 are integrally formed.

While the base member is molded into the actuators 213, groove portions 215 recessed by a predetermined depth may be formed between the key-shaped parts 211 by the shape of the mold. Here, the frame part 220 may be coupled onto the groove portions 215 to cover the side surfaces of the key-shaped parts 211. The coupling between the groove portions 215 and the key-shaped parts 211 may be performed using a coupling member such as a both-sided tape.

The foregoing embodiments and advantages of the mobile terminal and a keypad fabricating method thereof are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
 a wireless communication unit configured to wirelessly communicate with at least one other terminal;
 a display unit configured to display information;
 a circuit board having one surface with a plurality of switches thereon; and a keypad disposed over the circuit board and having keys that when pressed, contact corresponding switches on the circuit board,
wherein the keypad further includes:
a plurality of actuators corresponding to and protruding towards the plurality of switches;
key-shaped parts laminated on the actuators, respectively, and each having a predetermined height; and
a film part disposed to obscure the key-shaped parts and having one surface with key marks in correspondence with the key-shaped parts so as to form the keys of the keypad,
wherein the key-shaped parts and the film part are integrally formed together, and
wherein the actuators include extending portions extending from a protruding portion protruding toward the plurality of switches such that the actuators are integrally connected to one another by the extending portions.

2. The terminal of claim 1, wherein the keypad further includes:
groove portions recessed a predetermined depth formed between the key-shaped parts and disposed on the extending portions; and
a frame part disposed on the groove portions to partially cover side surfaces of the key-shaped parts.

3. The terminal of claim 2, wherein the frame part is integrally formed and coupled onto the groove portions.

4. The terminal of claim 2, wherein the extending portions engaged with the groove portions are thinner than portions of the actuators having the key-shaped part disposed thereon.

5. The terminal of claim 4, wherein the keypad further includes:
a light guide film covering the switches and laminated between the actuators and the circuit board such that when a corresponding key-shaped part and actuator are pressed onto each other, a transmittance of light is enhanced.

6. The terminal of claim 1, wherein the actuator includes a flexible rubber material.

7. The terminal of claim 1, wherein the key-shaped part includes polycarbonate (PC).

8. The terminal of claim 1, wherein each key-shaped part includes upper and lower surfaces and a plurality of side surfaces, and the film part partially covers the upper surface and the plurality of side surfaces of the key-shaped part.

9. A mobile terminal comprising:
a first body and a second body;
a slide module allowing the first and second bodies to be movable relative to each other; and
a keypad disposed on one surface of the second body,
wherein the keypad includes:
a plurality of actuators;
key-shaped parts laminated on the actuators, respectively, and each having a predetermined height; and
a film part disposed to cover the key-shaped parts and having one surface with key marks corresponding to the key-shaped parts,
wherein the film part, the key-shaped parts and the actuators are integrally coupled to each other without a gap between the film part and the key-shaped parts and between the key-shaped parts and the actuators, and
wherein the actuators include extending portions extending from a protruding portion protruding toward a plurality of switches on a circuit board such that the actuators are integrally connected to one another by the extending portions.

10. The terminal of claim 9, wherein the keypad further includes:
groove portions recessed a predetermined depth formed between the key-shaped parts and disposed on the extending portions; and
a frame part disposed on the groove portions to partially cover side surfaces of the key-shaped parts.

11. The terminal of claim 10, wherein the frame part is integrally formed and coupled onto the groove portions.

12. The terminal of claim 10, wherein the extending portions engaged with the groove portions are thinner than portions of the actuators having the key-shaped part disposed thereon.

13. The terminal of claim 12, wherein the keypad further includes:
a light guide film covering the switches and laminated between the actuators and the circuit board such that when a corresponding key-shaped part and actuator are pressed onto each other, a transmittance of light is enhanced.

14. The terminal of claim 9, wherein each key-shaped part includes upper and lower surfaces and a plurality of side surfaces, and the film part partially covers the upper surface and the plurality of side surfaces of the key-shaped part.

15. A method for fabricating a keypad in a mobile terminal, the method comprising:
forming a key mark on a first surface of a film part;
coating an adhesive member on a second surface of the film part and disposing a key-shaped part with a predetermined thickness on the adhesive member; and
placing the key-shaped part and the film part into a mold and disposing a base member to cover the key-shaped part and the film part, so as to mold the base member into a form of a protruding actuator; and
pressing the film part, the key-shaped part and the actuator so that they are integrally formed,
wherein the actuator includes extending portions extending from a protruding portion protruding toward a plurality of switches on a circuit board such that the actuators are integrally connected to one another by the extending portions.

16. The method of claim 15, wherein the base member includes a flexible rubber material.

17. The method of claim 15, wherein the molding of the base member into the actuator comprises:
pressing the base member to form a groove portion recessed by a predetermined depth between the key-shaped parts.

18. The method of claim 17, further comprising:
coupling a frame part onto the groove portion to cover side surfaces of the key-shaped part.

* * * * *